US006964487B2

(12) United States Patent
Olsen et al.

(10) Patent No.: US 6,964,487 B2
(45) Date of Patent: Nov. 15, 2005

(54) IMAGE DISPLAY DEVICE

(75) Inventors: Gordon L. Olsen, Las Vegas, NV (US);
Pat S. Harrison, El Cajon, CA (US)

(73) Assignee: StarVision Optics, Inc., Lake Barrington, IL (US)

( * ) Notice: Subject to any disclaimer, the term of this patent is extended or adjusted under 35 U.S.C. 154(b) by 37 days.

(21) Appl. No.: 10/775,636

(22) Filed: Feb. 10, 2004

(65) Prior Publication Data

US 2005/0174660 A1   Aug. 11, 2005

(51) Int. Cl.[7] .............................................. G02B 5/10
(52) U.S. Cl. ...................... 359/869; 359/848; 359/867; 359/871; 353/74; 353/77; 348/789; 348/836
(58) Field of Search ................................ 359/626, 848, 359/853, 867, 869, 871; 353/74, 77, 98, 102, 353/119; 348/42, 51, 54, 787, 789, 794, 837, 348/836

(56) References Cited

U.S. PATENT DOCUMENTS

| 4,299,446 A | * | 11/1981 | Jenkins, Jr. .................. 359/846 |
| 4,776,118 A |   | 10/1988 | Mizuno ......................... 40/219 |
| 5,130,856 A | * | 7/1992  | Tichenor et al. ............. 359/857 |
| 5,833,340 A | * | 11/1998 | Yoshikawa et al. ........... 353/98 |
| 6,386,719 B1 | * | 5/2002  | Lee ............................. 359/879 |
| 6,598,976 B2 |   | 7/2003  | Westort et al. ................ 353/28 |
| 6,612,701 B2 |   | 9/2003  | Westort et al. ................ 353/10 |
| 6,650,470 B1 |   | 11/2003 | Turner et al. ............... 359/443 |
| 2003/0147145 A1 |   | 8/2003 | Robinson et al. ........... 359/649 |
| 2003/0210380 A1 |   | 11/2003 | Westort et al. ................ 353/28 |

* cited by examiner

*Primary Examiner*—Hung Xuan Dang
*Assistant Examiner*—Joseph Martinez
(74) *Attorney, Agent, or Firm*—Park & Sutton LLP; John K. Park

(57) ABSTRACT

An image display device includes a case having an opening, a luminous source image display displaying a first image, a focusing element receiving light from the source image display and focusing the light to form a second image that is viewable through the opening of the case, and an image source providing image information to the source image display so that the source image display displays the first image. The focusing element has a concave mirror and a mirror supporter that supports the concave mirror. The perimeter of the concave mirror has at least one straight-cut portion that has a line contact with the mirror supporter. The image information provided by the image source is changed with user interaction.

7 Claims, 6 Drawing Sheets

FIG. 1
FIG. 2
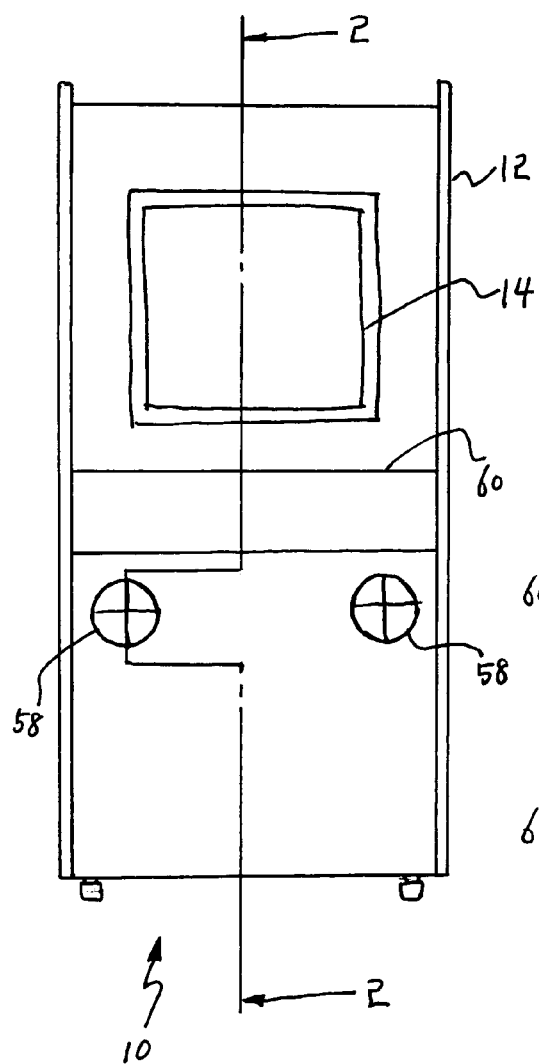
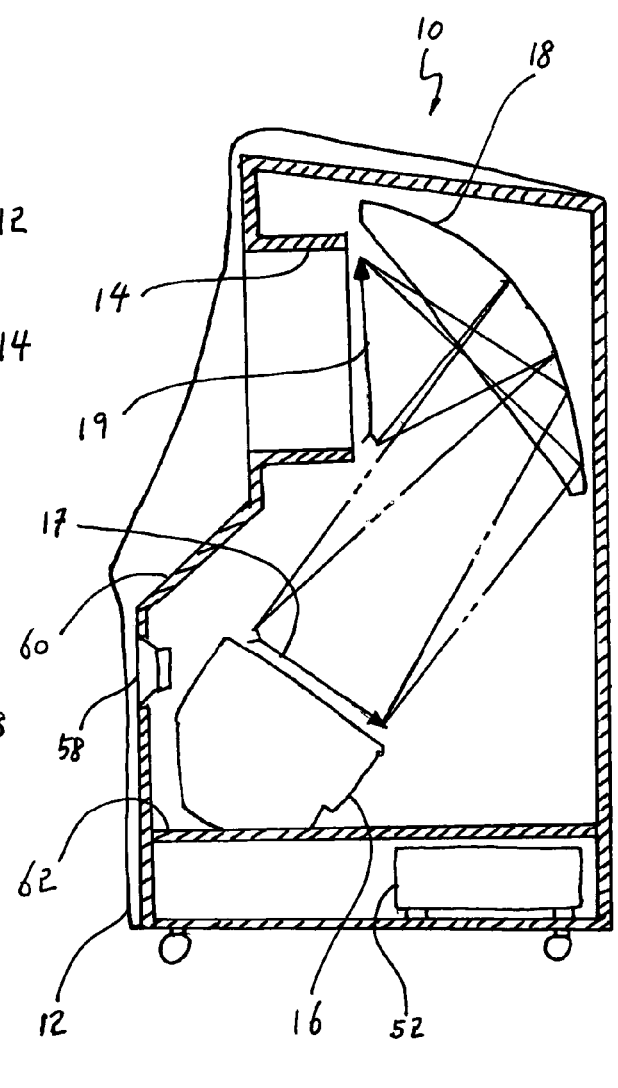

FIG. 4
FIG. 5
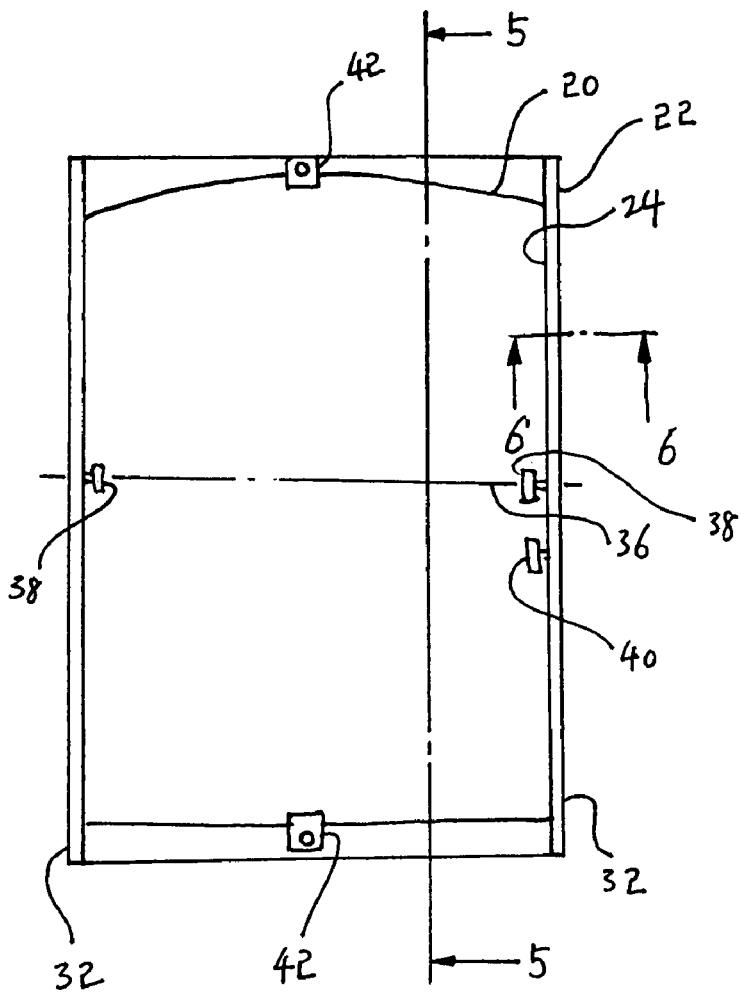
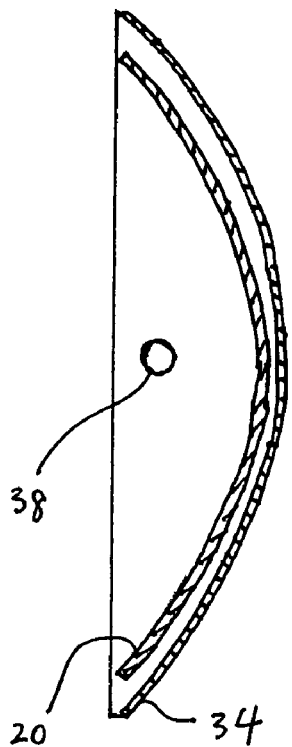
FIG. 6
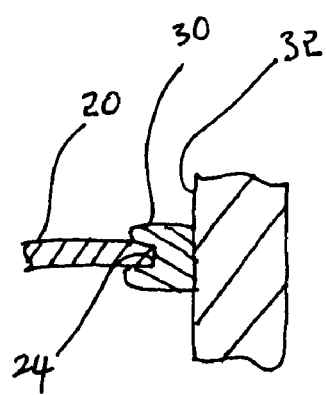

IMAGE DISPLAY DEVICE

BACKGROUND OF THE INVENTION

The present invention relates to an image display device. More particularly, this invention relates to an image display device that provides a simulated three-dimensional image with a concave mirror.

Three-dimensional imagery has long been enjoyed by millions of people worldwide. Theme parks, movie houses, video arcades, and I Max type theaters have offered this exciting technology for years. The production of these offerings is expensive, the space requirements can be enormous, and, in most cases, the viewer has to use special glasses for viewing. While these glasses may be suitable for the many uses, or for general use, such as when one is seated in a theater, they would not be as suitable for many of the purposes planned by the inventor.

Two dimensional imagery has been employed for many years by many advertisers, producers, and educators in stationary kiosks, wall or ceiling mounted monitors, and overhead screens in a variety of locations such as trade shows, retail outlets, shopping centers, museums, and schools. The kiosks are small and do not require much floor space and the wall or ceiling mounted monitors and the large screens provide an effective means to display large images. Two-dimensional imagery does not require the viewer to use the special glasses but is still the attention getter desired by the owner/advertiser.

U.S. Pat. No. 4,776,118 discloses a display device that includes a concave mirror that reflects light from a light source inside the device and forms a real image that is viewable outside the device. The display device of '118 is an example of an image display device that can provide a simulated three-dimensional image.

SUMMARY OF THE INVENTION

The present invention provides an improved construction for an image display device that employs a concave mirror to provide simulated three-dimensional image.

An objective of the invention is to provide an image display device that can display high quality, simulated, three-dimensional images, and that can be produced at reasonable manufacturing cost.

Another objective of the invention is to provide a mirror supporting device that can support a concave mirror, which is the central optical element of the image display device, stably and accurately.

Still another objective of the invention is to provide an image display device that provides images changeable with user interaction.

To achieve the above objectives, an aspect of the invention provides an image display device having a case with an opening, a luminous source image display displaying a first image, and a focusing element receiving light from the source image display and focusing the light to form a second image that is viewable through the opening of the case. The source image display and the focusing element are positioned within the case. The focusing element includes a concave mirror and a mirror supporter that supports the concave mirror, and the perimeter of the concave mirror includes at least one straight-cut portion that has a line contact with the mirror supporter.

The concave mirror is substantially having a shape of a partial spherical surface. The concave mirror is made by vacuum drawing a flat plastic plate into a hemispherical shape, and cutting the drawn plate into a predetermined shape. Preferably, the concave mirror is underdrawn. More preferably, the concave mirror is underdrawn by 12%.

The concave mirror has a front surface and a back surface. The front surface directs toward the opening, and the back surface is coated with substantially black material.

Preferably, the perimeter of the concave mirror includes two of the straight-cut portions and they are parallel with each other.

Preferably, a flexible strip is provided between the straight-cut portion and the mirror supporter.

The mirror supporter includes two side panels and a back panel that connects the two side panels. The side panel forms a line contact with the straight-cut portion. The back panel covers and protects the back surface of the concave mirror.

The mirror supporter can be pivoted whereby the concave mirror can be pivoted. Each of the side panels includes a pivot axis around which the mirror supporter can pivot.

One of the side panels further includes a lock member that blocks pivoting of the mirror supporter.

The back panel includes at least one supporting portion that supports the concave mirror between the side panels.

In another embodiment of the mirror supporter, each of the side panels includes a wing that extends opposite the concave mirror and beyond the back panel. The wing includes one or more attaching points that attach the mirror supporter to the case. This facilitates assembly of the mirror supporter from backside of the case.

The image display device further includes an image source that provides image information to the source image display, so that the source image display displays the first image. The image source may be a DVD player or a computer.

The image display device further includes a sensor device that senses position of a user's hand in a plane at the opening. The sensed position is used to change the image information provided by the image source, so that the second image is changed by interaction with a user.

Another aspect of the invention provides an image display device including a case with an opening, a luminous source image display displaying a first image, and a focusing element receiving light from the source image display and focusing the light to form a second image that is viewable through the opening of the case. The source image display and the focusing element are positioned within the case. The focusing element includes a concave mirror and a mirror supporter that supports the concave mirror, and the perimeter of the concave mirror includes two parallel straight-cut portions, each of which has a line contact with the mirror supporter.

Still another aspect of the invention provides an image display device including a case with an opening, a luminous source image display displaying a first image, a focusing element receiving light from the source image display and focusing the light to form a second image that is viewable through the opening of the case, and an image source providing image information to the source image display so that the source image display displays the first image. The source image display and the focusing element are positioned within the case. The focusing element includes a concave mirror and a mirror supporter that supports the concave mirror. The perimeter of the concave mirror includes at least one straight-cut portion that has a line contact with the mirror supporter. The image information provided by the image source is changed with user interaction.

The advantages of the present invention are: (1) a portable, reasonably priced, simulated three-dimensional display is provided; (2) the concave mirror in the display is easy to assemble and positioned stably; (3) display effect is enhanced by the interactive feature.

Although the present invention is briefly summarized, the fuller understanding of the invention can be obtained by the following drawings, detailed description and appended claims.

DESCRIPTION OF THE FIGURES

These and other features, aspects and advantages of the present invention will become better understood with reference to the accompanying drawings, wherein:

FIG. 1 is a front elevation view of the image display device of the present invention;

FIG. 2 is a cross-sectional view of the image display device taken along the line 2—2 in FIG. 1;

FIG. 4 is a front elevation view of the focusing element;

FIG. 5 is a cross-sectional view of the focusing element taken along the line 5—5 in FIG. 4;

FIG. 6 is a detailed cross-section view of the focusing element taken along the line 6—6 in FIG. 4;

DETAILED DESCRIPTION OF THE INVENTION

Figure 3:
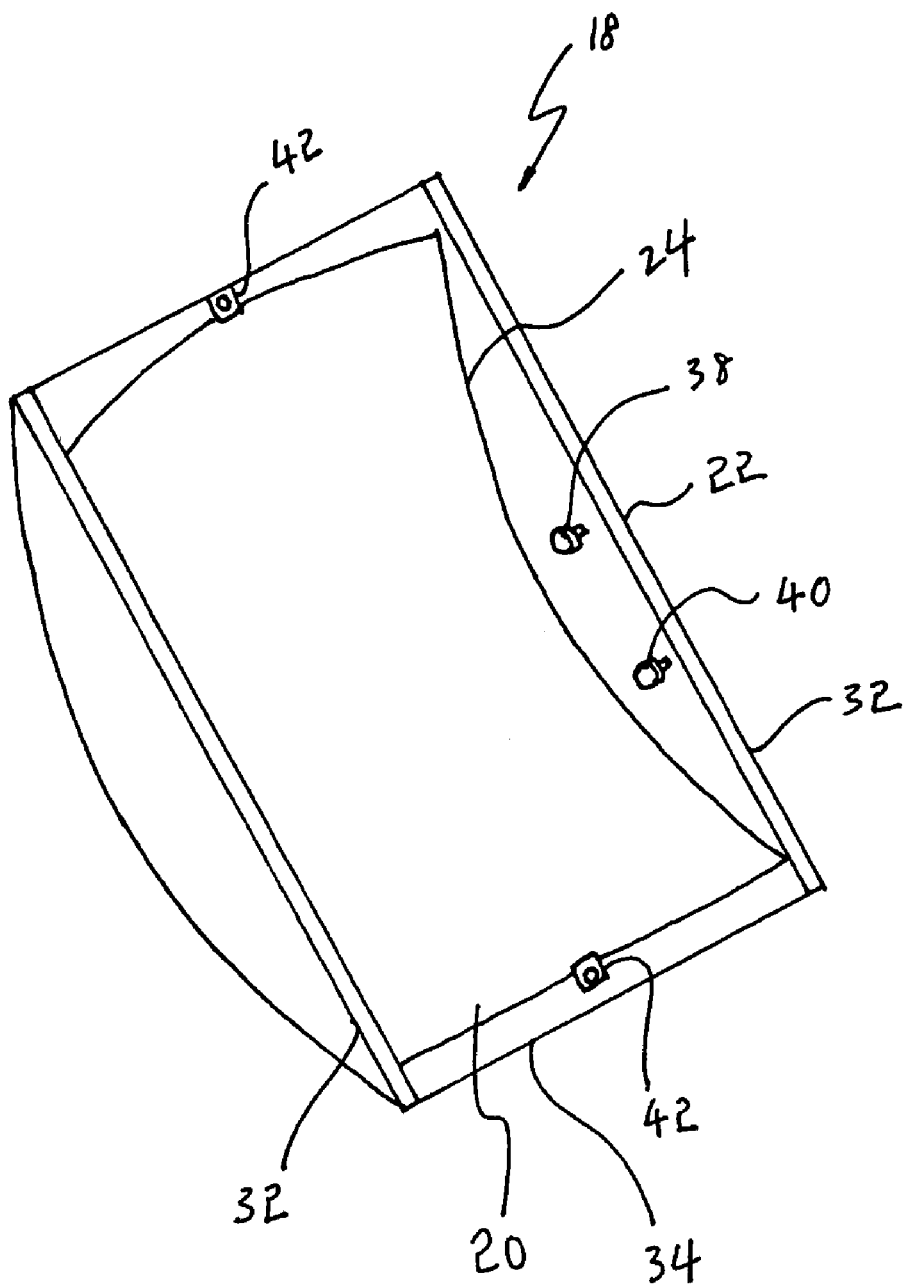
FIG. 3 is a perspective view of a focusing element.

FIG. 1 shows an image display device 10 according to the present invention. The image display device 10 includes a case 12 with an opening 14, a luminous source image display 16 displaying a first image 17, and a focusing element 18 receiving light from the source image display 16 and focusing the light to form a second image 19 that is viewable through the opening 14 of the case 12. The focusing element 18 and the source image display 16 is positioned within the case 12. The source image display 16 may be a CRT monitor, a flat panel display or any other luminous image display. The wiring to connect the various electric components has been omitted for clarity. In front of the case 12, there is a sloping face 60 below the opening 14. The sloping face 60 is sloped at about 60° from the horizontal and, provides the transition to the lower part of the case 12, which is wider than the upper part of the case 12. The sloping face 60 prevents viewers from placing drinks, cigarettes, etc. on the case 12. Inside the case 12, a shelf 62 is provided below the source image display 16. The shelf 62 supports the source image display 16, and partitions the case 12, so that an image source 52, which is explained later, may be positioned below the shelf 62.

FIGS. 3–6 show the focusing element 18. The focusing element 18 includes a concave mirror 20 and a mirror supporter 22 that supports the concave mirror 20. The perimeter of the concave mirror 20 includes at least one straight-cut portion 24 that has a line contact with the mirror supporter 22. The mirror supporter 22 is designed to stabilize the concave mirror 20 during assembly, shipping, and normal moving during use.

The case 12 blocks any light from outside so that only the light from the source image display 16 can reach the concave mirror 20.

Figure 7:
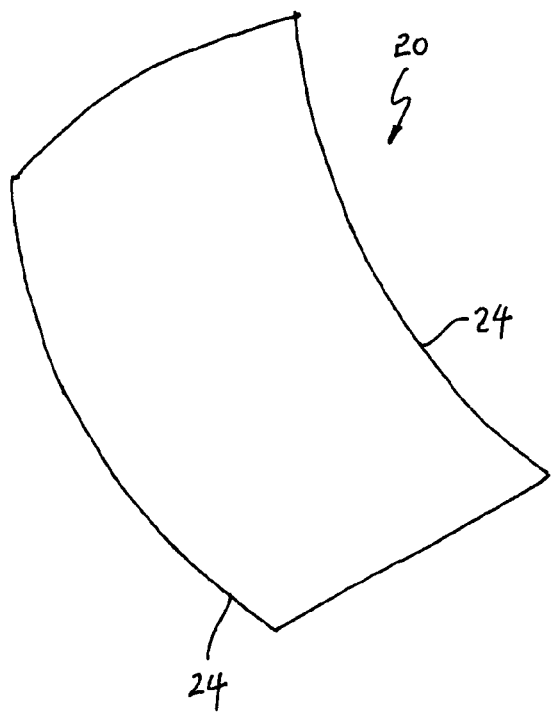
FIG. 7 is a perspective view of a concave mirror.
Figure 8:
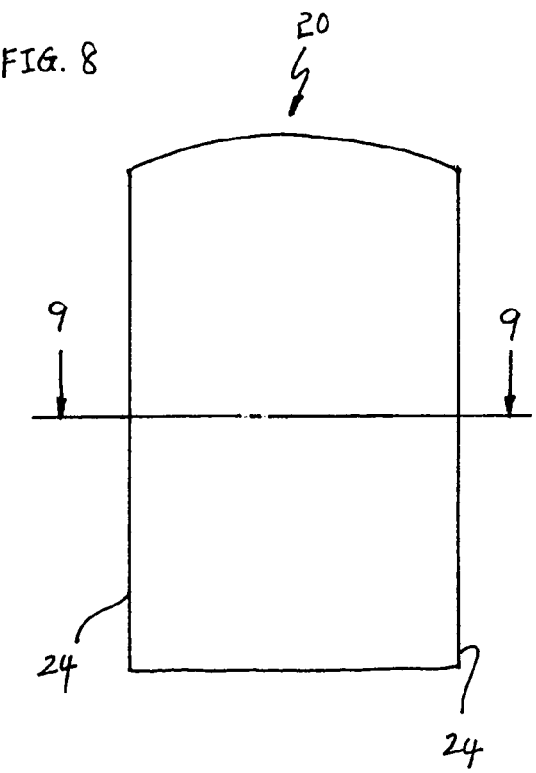
FIG. 8 is a front elevation view of the concave mirror.
Figure 9:
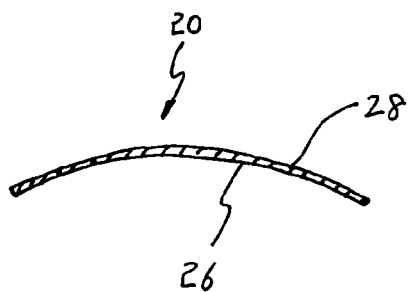
FIG. 9 is a cross-section view of the concave mirror taken along the line 9—9 in FIG. 8.

FIGS. 7–9 show the concave mirror 20. The concave mirror 20 is substantially having a shape of a partial spherical surface. The concave mirror 20 is made by vacuum drawing a flat plastic plate into a hemispherical shape, and cutting the drawn plate into a predetermined shape.

The concave mirror 20 is made by the following process. A flat acrylic plastic plate ($\frac{1}{8}^{th}$ thickness) is vacuum drawn to a hemi-spherical dome. The hemispherical dome is coated with a high-density acrylic black coating. Then the dome is bisected into quarters. To obtain quality required for a mirror, care should be taken in selection of pure material and precision equipment for the process. The magnitude of vacuum, temperature, and rate of draw in the vacuum drawing process must be controlled within strict tolerance ranges.

The shape of the concave mirror 20 is three-dimensional. Straight-cut portion 24 means that the portion looks straight when viewed from a specific direction. FIG. 8 shows the concave mirror 20 in an elevation view, and two parallel straight-cut portions 24.

When the concave mirror 20 is drawn to the shape of a hemispherical dome, the radius from anywhere of the dome is the same. The effects of overdrawing and underdrawing were researched. It was determined that a mirror that was drawn to a depth of twelve percent short of its radius provided the most ideal image. That is, prefeably, the concave mirror 20 is underdrawn. More preferably, the concave mirror 20 is underdrawn by 12%. The 12% underdrawing may be expressed: D=0.88 R. D is the distance between the farthest point of the vacuum drawn mirror, and the plane of the flat acrylic plate before vacuum drawing. R is the radius of the ideal hemisphere.

The concave mirror 20 has a front surface 26 and a back surface 28. The front surface 26 directs toward the opening 14 when the concave mirror 20 and the mirror supporter 22 are assembled in place in the case 12. The back surface 28 is coated with substantially black material.

The perimeter of the concave mirror 20 includes two straight-cut portions 24, and the straight-cut portions 24 are parallel with each other, as shown well in FIG. 8.

The mirror supporter 22 includes two flat side panels 32 and a back panel 34 that connects the two side panels 32 and protects the concave mirror 20. The two side panels 32 of the mirror supporter 22 form line contacts with the two straight-cut portions 24 of the concave mirror 20. These line contacts distribute the load between the concave mirror 20 and the mirror supporter 22, and prevents local stress concentration. Therefore, the concave mirror 20 is free from distortion that might be induced from locally concentrated stress, and the resulting optical image is free from optical distortion that might be caused by physical distortion of the concave mirror 20.

Referring back to FIG. 6, a flexible strip 30 is provided between the straight-cut portion 24 of the concave mirror 20 and the side panel 32 of the mirror supporter 22. The strip 30 facilitates more uniform support of the concave mirror 20 by the mirror supporter 22.

The mirror supporter 22 can be pivoted so that the concave mirror 20 can be pivoted. This enables adjustment of position of the concave mirror 20 within the case 12. Each of the side panels 32 includes a pivot axis 36 around which the mirror supporter 22 can pivot. Two pivot screw 38 provided on the side panels 32 form the pivot axis 36.

One of the side panels 32 further includes a lock member 40 that blocks pivoting of the mirror supporter 22. After positional adjustment of the concave mirror 20 is done, the lock member 40, which may be a screw, is engaged.

The back panel 34 includes at least one supporting portion 42 that supports the concave mirror 20 between the side panels 32. While the line contacts between the side panels 32 and the concave mirror 20 mainly support the concave mirror 20, the supporting portion 42 provides mainly guiding and fixing the position of the concave mirror 20.

Figure 10:
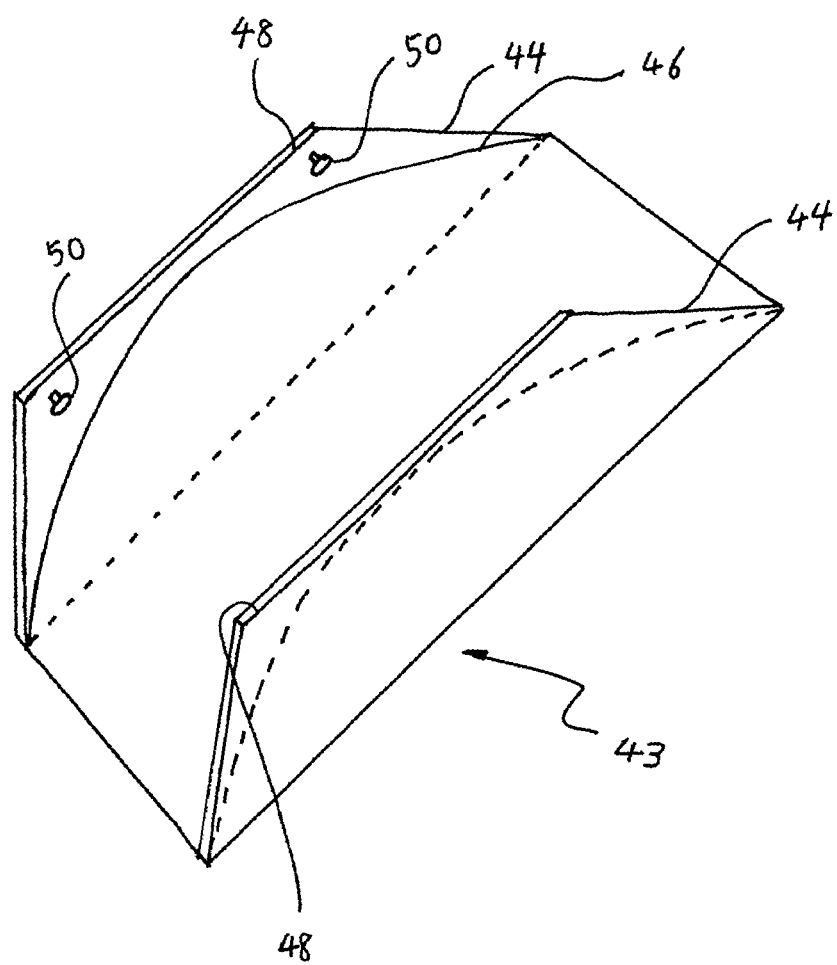
FIG. 10 is a perspective view showing another embodiment of a mirror supporter.

FIG. 10 shows another embodiment of a mirror supporter 43. The mirror supporter 43 has two side panels 44 and a back panel 46. The side panels 44 and the back panel 46 of the mirror supporter 43 are similar to the side panels 32 and the back panel 34 of the mirror supporter 22, but each of the side panels 44 includes a wing 48 that extends opposite the concave mirror 20 supported by the mirror supporter. The wing 48 includes two attaching points 50 that attach the mirror supporter 43 to the case 12. This embodiment facilitates assembly of the mirror supporter 43 within the case 12.

Preferably, the mirror supporter 22 shown in FIGS. 3 and 4 is used when the case 12 is designed for horizontal installation, and the mirror supporter 43 shown in FIG. 10 is used when the case 12 is designed for vertical installation. However, the shapes and features of the mirror supporters 22, 43 can be applied in any directional installation of the image display device 10.

Referring back to FIG. 2, the image display device 10 further includes the image source 52 that provides image information to the source image display 16, so that the source image display 16 displays the first image. Preferably, the image source 52 is a DVD player or a computer. A computer may provide more advanced interactive function than a DVD player.

Figure 11:
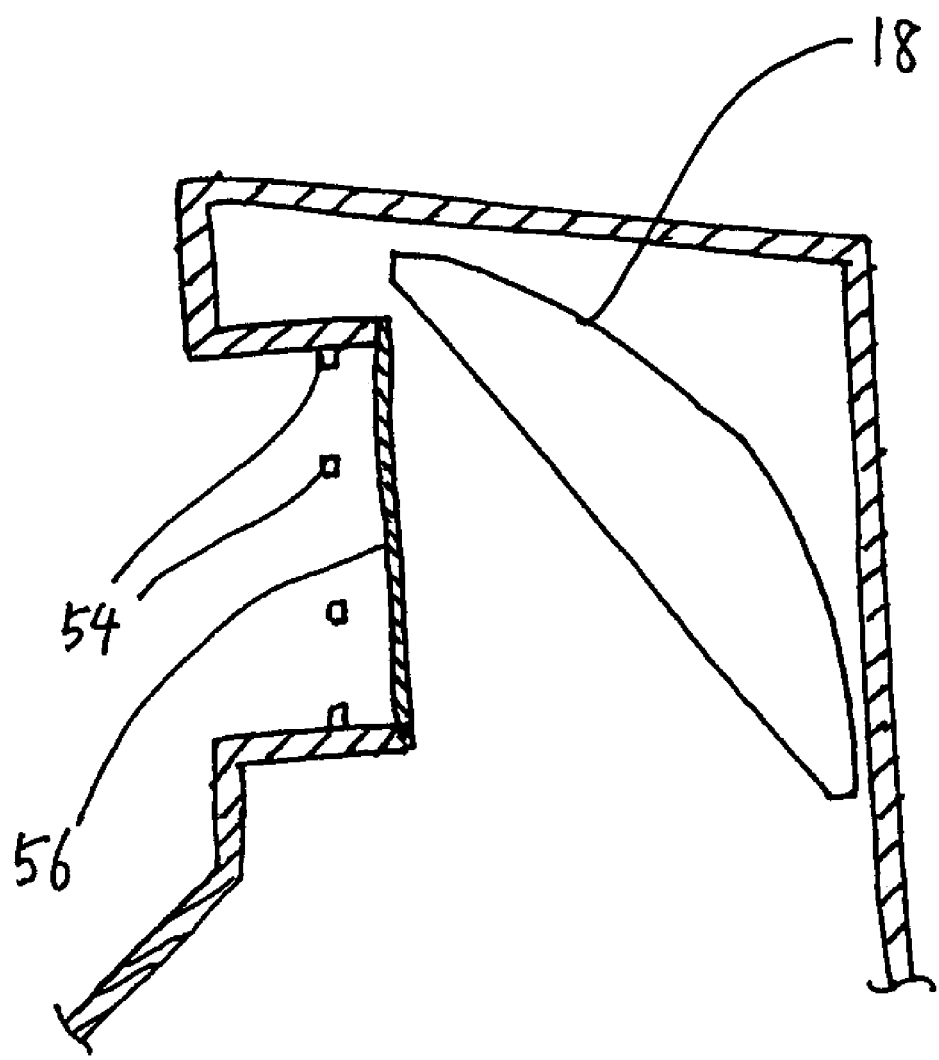
FIG. 11 is a schematic cross-section view showing a sensor device.

FIG. 11 shows that the image display device 10 further includes a sensor device 54 that senses position of a user's hand in a plane at the opening 14. The sensor device 54 includes an array of sensors arranged around the opening 14. The area of the opening 14 is divided into sections with the array of sensors. The sensed position or section by the sensor device 54 is used to change the image information provided by the image source 53, so that the second image is changed by interaction with a user. A plexiglass screen 56 may be provided to keep viewers from touching the concave mirror 20. Speaker unit 58 is also provided around the opening 14.

The invention uses a hemispherical mirror in combination with other commercially available technical products to produce a cost effective three dimensional theater. The concave mirror can be used to project life size or larger images for venues that would require larger than those in the kiosk. Accordingly, the mirror is manufactured in a much larger size to accommodate the owner or advertiser's needs. The invention seeks out additional markets for this technology. Accordingly, the mirrors may be made larger or smaller, and the radii and the depth relationships may change.

The invention is related to produce a three dimensional image with an optional interactive feature in a theater/kiosk product. Potential customers can not only listen and view the three-dimensional promotional presentation and then, depending on the nature of the advertiser's market or desired buyer impact, viewers can also call up or select other products or services by reaching into the theater and "touching" the presenter or a menu shown on the screen.

To best serve customer needs and minimize floor space, the theater or the image display device 10 will be self standing (the vertical design) like many kiosks presently in service today, or it can be hung from a ceiling point. The image display device can also be placed on a counter (the horizontal design) for use in department stores, fast food outlets, etc.

The image display device is light enough to permit easy handling and moving. The image display device will be supplied with casters for easy moving. The case would normally be constructed of strong, durable, prefinished wood in a variety of colors. Plastic, brushed metal, or covered fabric may also be used. The lower portion of the front of the case, as well as the sides, will be available for additional advertising by the owner.

The image display device or kiosk is not unduly expensive. The durable nature of the components and the ability to change the video content of the programming at reasonable cost will enable the advertiser/producer to use the theater for may years with the cost effective opportunity to spread the costs of the video programming and production over multiple locations.

When the advertiser inserts his personalized DVD into the DVD player or turns on the computer, the presentation begins. When using the interactive unit, at selective times during the presentation, the viewer will be asked to touch the image's nose, ear, eye or some other image on the screen on the screen (such as a color chart or a list of products). When the viewer's finger or hand intersects with the sensor system in the location called for, the next image appears in the theater and continues the presentation. The sequences continue until the end of the presentation. The walls of the opening 14 project backward from the front of the case 12 to produce a darkened opening area reminiscent of a theater.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. An image display device comprising:
   a) a case comprising an opening;
   b) a luminous source image display displaying a first image, wherein the source image display is positioned within the case; and
   c) a focusing element receiving light from the source image display and focusing the light to form a second image that is viewable through the opening of the case, wherein the focusing element is positioned within the case;
   wherein the focusing element comprises a concave mirror and a mirror supporter that supports the concave mirror, and wherein the perimeter of the concave mirror comprises at least one straight-cut portion that has a line contact with the mirror supporter, wherein a flexible strip is provided between the straight-cut portion and the mirror supporter.

2. An image display device comprising:
   a) a case comprising an opening;
   b) a luminous source image display displaying a first image, wherein the source image display is positioned within the case; and
   c) a focusing element receiving light from the source image display and focusing the light to form a second image that is viewable through the opening of the case, wherein the focusing element is positioned within the case;
   wherein the focusing element comprises a concave mirror and a mirror supporter that supports the concave mirror, and wherein the perimeter of the concave mirror comprises at least one straight-cut portion that has a line contact with the mirror supporter, wherein the mirror supporter comprises two side panels and a back panel that connects the two side panels, wherein the perimeter of the concave mirror comprises two of the parallel straight-cut portions, wherein the two side panels form line contacts with the two straight-cut portions, wherein each of the side panels comprises a pivot axis around which the mirror supporter can pivot, wherein one of the side panels further comprises a lock member that blocks pivoting of the mirror supporter.

3. An image display device comprising:

a) a case comprising an opening;

b) a luminous source image display displaying a first image, wherein the source image display is positioned within the case; and c) a focusing element receiving light from the source image display and focusing the light to form a second image that is viewable through the opening of the case, wherein the focusing element is positioned within the case;

wherein the focusing element comprises a concave mirror and a mirror supporter that supports the concave mirror, and wherein the perimeter of the concave mirror comprises at least one straight-cut portion that has a line contact with the mirror supporter, wherein the mirror supporter comprises two side panels and a back panel that connects the two side panels, wherein the perimeter of the concave mirror comprises two of the parallel straight-cut portions, wherein the two side panels form line contacts with the two straight-cut portions, wherein the back panel comprises at least one supporting portion that supports the concave mirror between the side panels.

4. An image display device comprising:

a) a case comprising an opening;

b) a luminous source image display displaying a first image, wherein the source image display is positioned within the case; and c) a focusing element receiving light from the source image display and focusing the light to form a second image that is viewable through the opening of the case, wherein the focusing element is positioned within the case;

wherein the focusing element comprises a concave mirror and a mirror supporter that supports the concave mirror, and wherein the perimeter of the concave mirror comprises at least one straight-cut portion that has a line contact with the mirror supporter, further comprising an image source that provides image information to the source image display, whereby the source image display displays the first image, further comprising a sensor device that senses position of a user's hand in a plane at the opening.

5. The image display device of claim 4, wherein the position sensed by the sensor device is used to change the image information provided by the image source, whereby the second image is changed by interaction with a user.

6. An image display device comprising:

a) a case comprising an opening;

b) a luminous source image display displaying a first image, wherein the source image display is positioned within the case; and c) a focusing element receiving light from the source image display and focusing the light to form a second image that is viewable through the opening of the case, wherein the focusing element is positioned within the case;

wherein the focusing element comprises a concave mirror and a mirror supporter that supports the concave mirror, and wherein the perimeter of the concave mirror comprises two parallel straight-cut portions, each of which has a line contact with the mirror supporter, wherein flexible strips are provided between the straight-cut portions and the mirror supporter.

7. The image display device of claim 6, wherein the mirror supporter can be pivoted whereby the concave mirror can be pivoted.

* * * * *